Aug. 8, 1967   R. A. REED ET AL   3,334,723
TRANSFER CONVEYOR UNITS AND CONTROL SYSTEMS THEREFOR
Filed Sept. 27, 1966   6 Sheets-Sheet 1

Aug. 8, 1967   R. A. REED ETAL   3,334,723
TRANSFER CONVEYOR UNITS AND CONTROL SYSTEMS THEREFOR
Filed Sept. 27, 1966   6 Sheets-Sheet 4

United States Patent Office 3,334,723
Patented Aug. 8, 1967

3,334,723
TRANSFER CONVEYOR UNITS AND CONTROL SYSTEMS THEREFOR
Reginald A. Reed, Menomonee Falls, and Harlan J. Taft, Hales Corners, Wis., and Wilton C. Warner, Lake Mills, Iowa, assignors to Cutler-Hammer, Inc., Milwaukee, Wis., a corporation of Delaware
Filed Sept. 27, 1966, Ser. No. 582,428
10 Claims. (Cl. 198—31)

This invention relates to article transfer conveyor units and control systems therefor and more particularly to article transfer units or branched conveyors of the diverging and converging types, the diverging type units being capable of receiving articles at a single inlet and selectively delivering them through either one of two branched outlets and the converging type units being capable of receiving articles at two inlets and for delivering them at a single outlet in a predetermined manner.

While not limited thereto, the invention is especially applicable to controlled conveyance and routing of articles such as untied stacks of newspapers or the like.

G. J. Bauch et al. Patent No. 3,254,752, dated June 7, 1966, discloses a diverting conveyor system or transfer section for diverting overflow articles which comprises a plurality of rows of diverter wheels of the skate-wheel type which can be pivoted from the direction of one outlet into alinement with another outlet conveyor to divert articles. This invention comprises improvements thereover.

An object of the invention is to provide an improved and simplified article control and transfer conveyor system.

A more specific object of the invention is to provide such article control and transfer conveyor system with improved means for turning free standing stacks of articles.

Another specific object of the invention is to provide such article control and transfer conveyor system with improved means selectively controllable for diverting free standing stacks of articles from a straight line path to an angular conveyor and for rendering such diverting means ineffective so that subsequent articles continue in the straight line path.

Another specific object of the invention is to provide such article control and transfer conveyor system with improved article diverging control means.

Another specific object of the invention is to provide such article control and transfer conveyor system with improved article converging control means.

Another specific object of the invention is to provide such article control and transfer conveyor system with improved means for turning free standing stacks of flat articles such as newspapers up to a substantial size without wrinkling the bottom one in the stack.

Another specific object of the invention is to provide a newspaper stack transfer unit which is simple in construction and easy to maintain.

Other objects and advantages of the invention will hereinafter appear.

These and other objects and advantages of the invention and the manner of obtaining them will best be understood by reference to the following description of preferred embodiments thereof taken in conjunction with the accompanying drawings, wherein.

Figure 1:
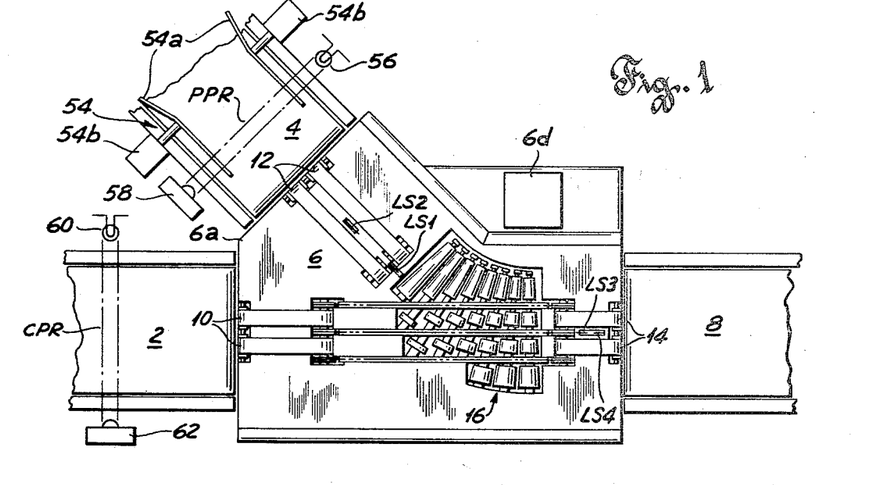
FIG. 1 is a top plan view of an article control and transfer conveyor system constructed in accordance with the invention.

Referring to FIG. 1, there is shown an article control and transfer conveyor system constructed in accordance with the invention which is especially applicable to transferring free standing newspaper stacks from one route to another. As will become apparent, this system can be operated either in the converging or diverging manner.

There is shown in FIG. 1 a pair of left-hand conveyors including a straight ahead conveyor 2 and an angular conveyor 4 abutting a stack transfer unit 6. The straight ahead conveyor 2 abuts the left end of the transfer unit and the angular conveyor 4 abuts an angular portion of the transfer unit. While the angular portion can be constructed at any desired angle in substantially 6 degree increments, for examplary purposes it has been shown at an angle of 45 degrees.

There is also shown in FIG. 1, a right-hand straight ahead conveyor 8 abutting the right end of the stack transfer unit.

When the system of FIG. 1 is operated in the converging mode, stacks enter on both conveyors 2 and 4 and are admitted in selective order through stack transfer unit 6 to conveyor 8. On the other hand, when the system is employed as a diverging device, newspaper stacks enter on conveyor 8 and pass through the transfer unit straight ahead to conveyor 2 or selective stacks may be diverted by the transfer unit to angular conveyor 4.

Figure 2:
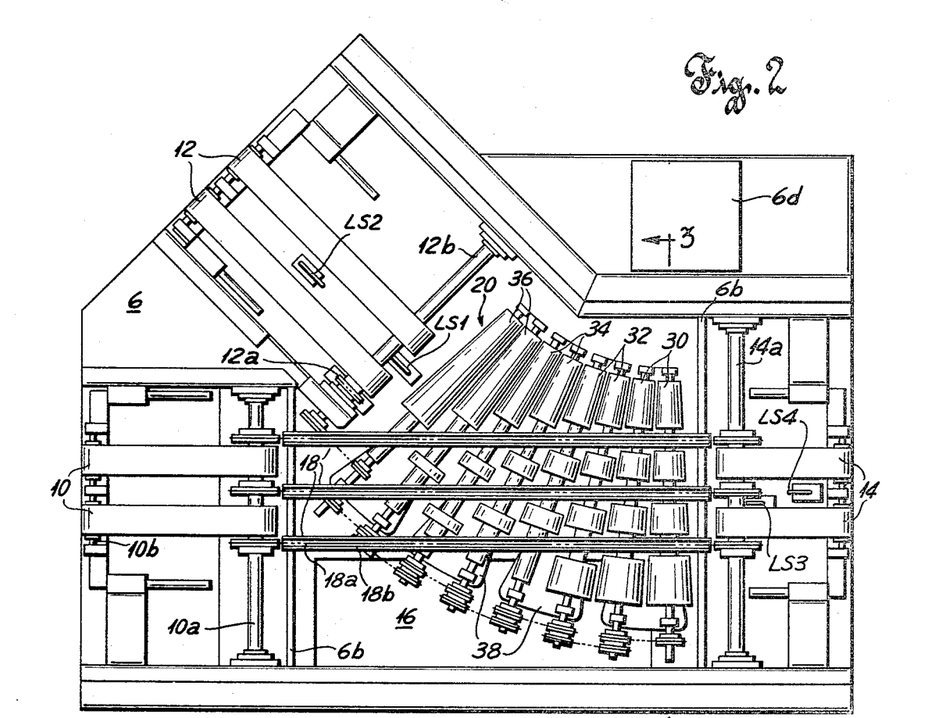
FIG. 2 is an enlarged top plan view of the newspaper stack transfer unit of FIG. 1 with the top plate removed exposing some of the internal mechanisms.
Figure 3:
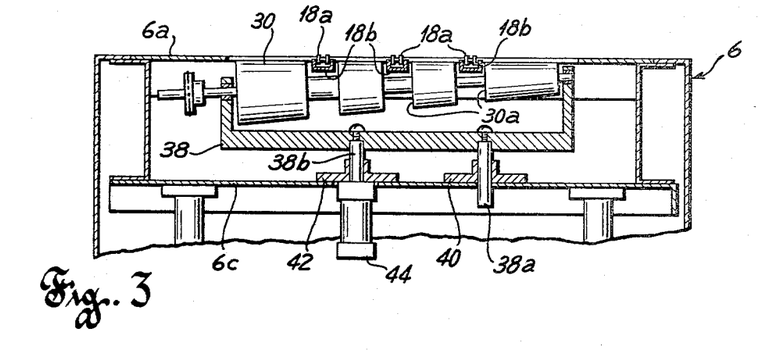
FIG. 3 is a cross-sectional view taken along line 3—3 of FIG. 2 showing the transfer roller raising mechanisms.

As shown in FIGS. 2 and 3, newspaper stack transfer unit 6 is similar to the unit shown in the aforementioned patent in its external configuration but the operating mechanisms have been improved and simplified for better performance. This transfer unit is provided with short belt conveyors which act as the infeed and outfeed conveyors for the unit and a transfer mechanism therebetween. As shown in FIG. 2, these belt conveyors comprise a pair of left-hand conveyors including a straight ahead belt conveyor 10 and an angular belt conveyor 12, and a single right-hand straight ahead belt conveyor 14. These belt conveyors are mounted and supported on the same frame with the transfer device to form a unitary structure which rests on the floor and contains all of its driving and controlling elements, requiring only connection of electrical power and compressed air to put it into operation.

Each such belt conveyor is provided with means for supporting and conveying articles to or from an external conveyor shown in FIG. 1 and to or from the transfer device hereinafter described. For this purpose, each such belt conveyor is provided with a pair of endless belts. These endless belts are driven by rollers mounted on a pair of spaced shafts, one of which is driven from below. As shown in FIG. 2, the two endless belts of conveyor 10 are frictionally driven by rollers on driving shaft 10a and are held taut by rollers on idler shaft 10b. The intermediate top portions of these belts slide over a suitable cover plate 6a shown in FIG. 1 to prevent the belts from sagging when a stack is being moved thereby. As shown in FIG. 2, these belt conveyors are of the proper lengths to extend from the transfer device 16 to the edges of the transfer unit.

Transfer device 16 is provided with means for moving stacks straight ahead or for selectively turning them. This means comprises a straight ahead chain conveyor 18 and a tapered roll turning conveyor 20.

Chain conveyor 18 is provided with three endless chains 18a which run over sprockets mounted on the driving shafts 10a and 14a of belt conveyors 10 and 14, respectively. The portions of these chains between shafts 10a and 14a run horizontally and are high enough above the cover plate 6a to support and move stacks of newspapers. For this purpose, metal channels 18b are mounted at opposite ends on frame cross bars 6b to guide the horizontal upper runs of the chains and to keep them from sagging when stacks are being conveyed. The manner whereby these chains are driven will be apparent in the schematic illustration in FIG. 4. As shown therein, a pair of shafts 24 and 26 are mounted in the frame below shafts 10a and 14a, respectively, it being kept in mind that this isometric showing is viewed from the angular conveyor side, that is, from the upper right-hand direction in FIG. 2. An electric motor 28 is mounted in the frame and is coupled by a chain 28a to drive shaft 26 or it could as well be coupled to shaft 24. Sprockets on shaft 26 engage the three endless chains to drive them over sprockets on idler shafts 10a, 14a and 24. Idler shafts 10a and 14a in turn constitute drive shafts for belt conveyors 10 and 14, respectively, as hereinabove described.

Tapered roll turning conveyor 20 is provided with means for turning stacks between the straight ahead conveyor and the angular conveyor. This means comprises a plurality of tapered rollers which can be raised by fluid power means so that upper peripheral portions thereof extend above the chain conveyor to convey stacks free of the chains and which can be lowered out of the way when straight ahead conveyance is desired. As shown in FIGS. 2 and 3, turning conveyor 20 is provided with a plurality of pairs of tapered rollers 30, 32, 34 and 36, the number of rollers required depending upon the turning angle desired. For example, four pairs of rollers are used for a turning angle of 45 degrees, a larger number of rollers, being required for a turning angle of 90 degrees.

The tapered rollers are provided with grooves or cutout portions through which the chain supporting channels extend. As shown in FIGS. 2 and 3, the right-hand roller of pair 30 is provided with three peripheral grooves 30a of substantially equal length since this roller is perpendicular to the chain supporting channels. The succeeding rollers to the left therefrom are provided with increasingly longer grooves since these rollers are arranged in an arc toward angular conveyor 12 such that the last roller 36 has its axis substantially parallel to the inner end of the angular conveyor. It will be apparent in FIG. 2 that as the rollers arc over toward the angular conveyor, the last peripheral groove, that is, the groove nearest the large end of the roller, in the fourth roller merges into the end of the roller. In the similar manner, the middle groove in the last pair of rollers 36 merge into the ends of these rollers as the major portion of these rollers lies outside the chain conveyor. As will be apparent, these peripheral grooves in the tapered rollers provide clearance for chain supporting channels 18b when they are in their lower positions as shown in FIG. 3. Moreover, these peripheral grooves are deep enough so that the grooved portions clear these channels when the rollers are raised to engage the newspaper stacks.

These tapered rollers are provided with means for raising and lowering them selectively in pairs as desired. This means comprises a supporting bracket 38 shown in FIGS. 2 and 3. As shown in FIG. 2 this bracket is tapered in top view, being wider at the large ends of the tapered rollers and has upstanding parts at its ends supporting pairs of bearings for the two tapered rollers, giving it a generally U-shaped configuration as shown in FIG. 3. Thus, one of these brackets 38 is provided for each adjacent pair of rollers so that the rollers of such pair are raised and lowered together by means hereinafter described.

As shown in FIG. 3, each bracket 38 is provided with means for guiding the same for movement in a vertical direction. This means comprises a guiding pin 38a rigidly secured to the bracket near one end and slidably extending downwardly through the round hole of a flanged guide member 40 which is rigidly secured to the upper surface of a horizontal supporting plate 6c mounted within the frame 6. A second pin 38b similar to pin 38a and spaced therefrom is rigidly secured to the center of gravity of the bracket assembly as shown in FIG. 3. This pin which is the air cylinder piston rod extends slidably through another flanged guide member 42 which is rigidly secured to plate 6c. This plate 6c is provided with a hole for pin 38a and a compressed air cylinder 44 which is mounted to flanged guide 42 and drivingly connected to bracket 38 for raising and lowering the two-roller and bracket assembly.

When compressed air is admitted into the lower end of cylinder 44, it drives the piston and rod 38b up to raise the roller pair. Pin 38a and rod 38b guide the upward movement of the roller pair and pin 38a prevents the roller assembly from turning on rod 38b. When compressed air is exhausted from the lower end of the cylinder and admitted into the upper end thereof, it drives the piston and rod 38b down to lower the roller pair. A solenoid operated valve is used to control the admission and exhaustion of compressed air into the cylinder as hereinafter described in connection with the circuit diagrams.

Figure 4:
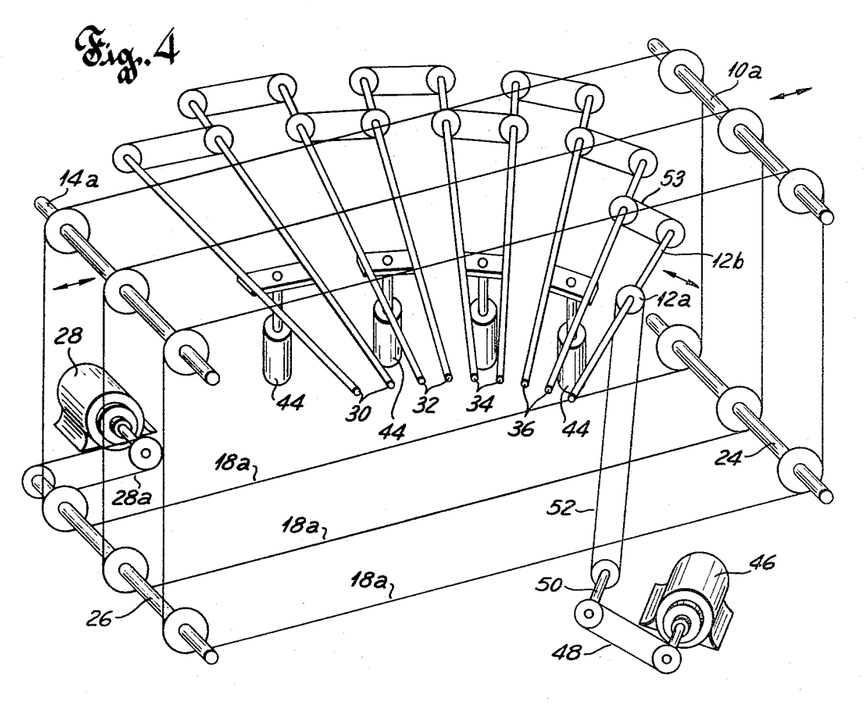
FIG. 4 is an isometric view showing schematically the driving mechanisms for the stack transfer unit of FIG. 2.

The transfer unit is provided with means for driving the tapered rollers as shown schematically in FIG. 4. An electric motor 46 is mounted in the frame 6 below plate 6c on a bottom mounting plate or the like. This motor operates through a chain 48 to drive a shaft 50 near the bottom of the frame. A chain 52 extends upwardly from a sprocket on shaft 50 to a sprocket 12a on the inner shaft 12b of angular, endless belt conveyor 12 as shown in FIGS. 2 and 4. In this manner, motor 46 drives belt conveyor 12. Shaft 12b in turn is coupled through sprockets and an endless chain 53 to the roller 36 shaft nearest the angular conveyor 12. In a similar manner, each tapered roller is coupled by sprockets and an endless chain to the next tapered roller so that motor 46 drives belt conveyor 12 and all of the tapered rollers.

The tapered rollers of each pair that are mounted on the same bracket may be coupled to one another by an endless chain since these rollers are not shifted relative to one another. However, it has been found that even the nearest rollers of adjacent pairs thereof can be coupled to one another through sprockets and an endless chain even though they are shiftable relative to one another when one pair of rollers is raised or lowered before the adjacent pair of rollers. It has been found that sufficient slack may be provided in the coupling chain to afford shifting of one roller pair relative to the other but still providing a good driving connection between the sprockets when both pairs are raised. Thus, this provides a simple and effective drive train permitting raising or lowering of the tapered rollers in selected steps.

The tapered rollers are preferably made of a material which has sufficient friction to move stacks of newspapers but which does not have so much friction as to cause creasing or wrinkling of the bottom newspaper of a stack as the stack is being turned. A reasonably good material for this purpose is polyurethane which when used in the tapered rollers affords movement of substantially high stacks without significant wrinkling of the bottom paper and can be cold molded without warping and is easier to shape by cutting than metal.

The operation of the system of FIG. 5 will now be described with reference to the converging transfer conveyor unit shown in FIG. 1. It will be apparent that photoelectric devices are mounted on both the branch inlet conveyor and in-line inlet conveyor to control the entry of articles in such order that no jam will occur. Also a bundle stopping or pacer mechanism is mounted on the branch inlet conveyor for gripping bundles while bundles are being admitted from the in-line conveyor. For this purpose, a pacer mechanism 54 shown schematically in FIG. 1 is provided with a pair of pacer plates 54a vertically arranged over opposite sides of conveyor 4 and having their upstream ends bent at an outward angle to diverge whereby to facilitate entry of a stack therebetween. These plates are moved toward one another by a pair of solenoid operated compressed air cylinders 54b to grip a bundle and to stop it. These air cylinders are also used to move the pacer plates away from the stack to release it for further travel. The solenoid for operating these air cylinders will be described in connection with the circuit in FIG. 5. For a more detailed description and illustration of mechanical features of a pacer mechanism, reference may be had to F. S. Hyer et al. Patent No. 3,189,156, dated June 15, 1965.

A pacer photoelectric relay PPR is mounted near the downstream end of pacer 54 to detect the arrival of a stack and to control the pacer as hereinafter described in connection with the circuit in FIG. 5. This relay comprises a light source such as a lamp bulb 56 and a photoelectric receiver or tube 58 which operates a switch contact when the light beam impinges thereon or is interrupted by a stack entering therebetween. This interruption of the light beam will cause operation of the pacer to stop the stack as hereinafter described.

A conveyor photoelectric relay CPR is similarly mounted on in-line conveyor 2 to detect the arrival of a stack near the transfer unit. This relay comprises a light source such as a lamp bulb 60 on one side of the conveyor and a photoelectric receiver or tube 62 at the other side of the conveyor which operates a switch contact when the light beam impinges thereon or is interrupted by a stack entering therebetween. This interruption of the light beam of relay CPR closes the pacer to prevent admission of any stacks from the angular conveyor until the last stack on the in-line conveyor has passed almost through the transfer unit or far enough so that minimum stack spacing will be maintained.

Figure 5:
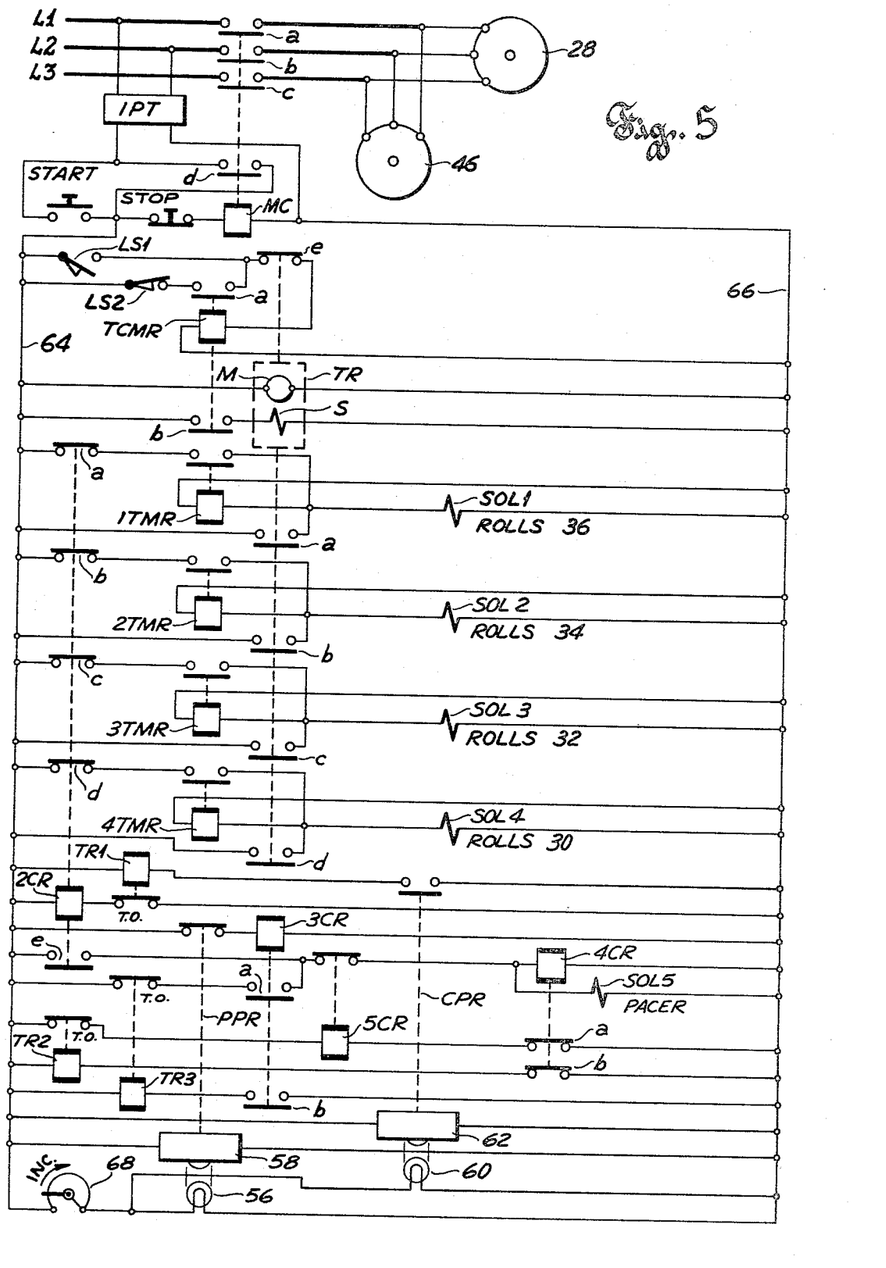
FIG. 5 is a circuit diagram of a converging control system for the stack transfer unit.

Referring now to the circuit diagram in FIG. 5, let it first be assumed that stacks arrive on both conveyors 2 and 4 and that stacks will be admitted from in-line conveyor 2 into the transfer unit.

When electric power has been connected to supply lines L1, L2 and L3, the START switch may be pressed to energize main contactor MC. This main contactor closes its contacts a, b and c to connect the supply lines to motors 28 and 46 whereby to start these motors running. As will be apparent in FIG. 4, motor 28 runs the straight ahead chain conveyor and in-line belt conveyors 10 and 14 whereas motor 46 runs the tapered rollers and angular belt conveyor 12. This main contactor also closes its contact d in shunt of the START switch whereby the latter may be released to allow it to reopen.

The closure of the START switch also applied electric power from transformer 1PT across conductors 64 and 66 which is thereafter maintained by contact d of the main contactor. As a result, motor M of timer TR starts running. This timer is of the type wherein the motor may run continuously and the timing function is started by energizing its clutch solenoid S. This timing function causes closure and reopening of contacts at selected times and opening of a resetting contact when the timing function has been completed to reset the timer to normal condition ready for reuse.

Electric power on conductors 64 and 66 also causes energization of lamps 56 and 60 through adjustable resistor 68. The light beams from these lamps impinge on photoelectric receivers 58 and 62, respectively, assuming that newspaper stacks are not blocking these light beams, to cause the normally closed contact of pacer photoelectric relay PPR to open and to cause the normally open contact of conveyor photoelectric relay CPR to close. The contact of relay PPR interrupts the circuit of relay 3CR to deenergize this relay if it was previously energized. The contact of relay CPR closes the circuit of timing relay TR1 across conductors 64 and 66. Relay TR1 energizes and after a predetermined time interval opens its timed opening contact to interrupt the circuit of relay 2CR to deenergize this relay if it was previously energized.

The aforementioned connection of electric power to conductors 64 and 66 also causes energization of timing relay TR2 through contact b of relay 4CR across these power conductors. After a predetermined time interval, relay TR2 opens its timed opening contact to interrupt the circuit of relay 5CR to deenergize this relay if it was previously energized.

The system in FIG. 5 is arranged to operate the transfer unit of FIG. 1 as a converging unit in such a manner that stacks will always be admitted from in-line conveyor 2 in preference to stacks on angular conveyor 4. That is, if stacks arrive on both conveyors, the stacks on in-line conveyor 2 will be admitted and the stacks on angular conveyor 4 will be held by pacer device 54. When all of the stacks on in-line conveyor 2 have been admitted or if there is a sufficient space between stacks thereon, then stacks will be admitted from the angular conveyor until a stack again is detected as approaching on the in-line conveyor as hereinafter more fully described. However, if stacks approach only on one of the conveyors 2 or 4, they will be admitted.

As aforementioned, the admission of stacks from the in-line conveyor 2 will first be described. When a stack arrives between the plates of the pacer 54 on the angular conveyor and interrupts the light beam of the pacer photoelectric relay, the latter recloses its contact shown at the lower portion of FIG. 5 to energize relay 3CR across conductors 64 and 66. Relay 3CR closes its contact a to energize relay 4CR and solenoid SOL5 in parallel, their circuit extending also through the normally closed contacts of relays 5CR and TR3 across conductors 64 and 66. Solenoid SOL5 operates to admit compressed air into both of the cylinders 54b in FIG. 1 to move pacer plates 54a toward one another and to center and grip the stack to stop it. The conveyor below the pacer may be of the traveling roller type disclosed in the aforementioned Hyer et al. patent so that while the stack is stopped the conveyor continues to move but the rollers are freely rotatable under the stack and do not apply significant forward force to the stack.

The aforementioned energization of relay 4CR causes opening of its contacts a and b. Contact a opens a second point in the circuit of relay 5CR and contact b interrupts the circuit of relay TR2. Although relay TR2 closes its contact in the circuit of relay 5CR, the latter does not energize since its circuit is now held open at contact a of relay 4CR.

The aforementioned energization of relay 3CR also causes closure of its contact b to energize stack spacing timing relay TR3 across conductors 64 and 66. This relay starts timing and will open its normally closed timing opening contact after a predetermined time interval if nothing else happens. The time interval of relay TR3 is at the minimum time delay required for timer TR to operate and reset before the next stack is released to reoperate the timer as hereinafter more fully described. It will be apparent from the foregoing that unless a stack arrives on the in-line conveyor, timing relay TR3 will eventually time out and deenergize solenoid SOL5 to cause the pacer to release the stack being held by it on the angular conveyor.

A stack now arrives on the in-line conveyor and interrupts the light beam of photo relay CPR to cause it to reopen its contact and to deenergize stack passage timing relay TR1. This really closes its contact to energize relay 2CR across conductors 64 and 66. Relay 2CR opens its contact a–d to interrupt the maintaining circuits of the transfer unit solenoids and closes its contact e to maintain solenoid SOL5 and relay 4CR energized. Timing relay TR3 now times out and opens its timed opening contact without effect since solenoid SOL5 and relay 4CR are held energized as aforesaid.

When the trailing end of the stack pases by photo relay CPR, the latter recloses its contact to energize timing relay TR1. This relay starts timing and after a predetermined time interval will open its timed opening contact to cause the pacer to release its stack if nothing else happens. The time interval of relay TR1 is set long enough so that the stack entering from the in-line conveyor will have passed the tapered rollers before they are raised by a stack coming from the pacer.

If another stack coming on the in-line conveyor interrupts the light beam of photo relay CPR before relay TR1 times out, relay CPR reopens its contact to deenergize relay TR1 thereby to stop it from timing. Thus, the contact of relay TR1 will remain closed and the pacer will not release any stack from the angular conveyor as long as stacks arrive on the in-line conveyor close enough to one another so that timing relay TR1 does not time out between stacks.

Let it now be assumed that either the space between in-line conveyor stacks is long enough or that stacks stop coming in on the in-line conveyor. As a result, timing relay TR1 times out and opens its contact to deenergize relay 2CR. Contacts a–d of relay 2CR close to prepare the aforesaid maintaining circuits and contact e thereof opens to interrupt energization of solenoid SOL5 and relay 4CR. This solenoid now operates the valve to admit air to the other ends of the cylinders to cause the pacer plates to move apart and to release the stack therebetween.

This stack will not enter the transfer unit and the tapered rolls will be raised a pair at a time in sequence to turn this stack to outlet conveyor 8. In the meantime, relays 5CR and TR2 will prevent the pacer from reclosing until the stack has moved away therefrom. For this purpose, relay 4CR closes its contacts a and b to energize relays 5CR and TR2. Relay 5CR opens its normally closed contact in the circuit of solenond SOL5 and relay 4CR to prevent the pacer from reclosing. Relay TR2 times and after a time interval long enough to permit the stack to move away from between the pacer plates opens its timed opening contact to deenergize relay 5CR. As a result, relay 5CR recloses its contact to permit reoperation of the pacer when another stack arrives thereat.

The stack that was released by the pacer now moves into the transfer unit and operates limit switches LS2 and LS1 in sequence. As shown in FIG. 5, limit switch LS2 is normally closed and is first opened by the stack to insure resetting of timer TR in the event it has been previously operated. As the stack approaches the first tapered roller, it closes limit switch LS1 to energize timer clutch maintaining relay TCMR. This relay closes its contact a in its maintaining circuit and closes its contact b to energize clutch solenoid S of timer TR across conductors 64 and 66. Since the timer motor M is running, this clutch solenoid energization starts the timing sequence.

The timer sequence whereby the tapered roll pairs are raised in sequence is as follows. The timer TR has four normally open operating contacts a–d and a fifth normally closed self-resetting contact e. Contacts a–d are closed and opened in over-lapping sequence followed by opening of contact e to reset the timer to normal or zero position from which it can be similarly reoperated. For example, each contact a to d may be closed and opened within a 1¼-second interval with 1-second overlap of the closed periods of succeeding contacts. Contact e may open for an interval when the last contact d of the sequence recloses.

Therefore, when the timer closes contact a, solenoid SOL1 and transfer maintaining relay 1TMR energize in parallel across conductors 64 and 66. Solenoid SOL1 operates a valve to admit compressed air into the lower end of a cylinder such as 44 in FIG. 3 to raise the first pair of tapered rolls 36. Relay 1TMR closes its contact to complete a maintaining circuit for itself and for solenoid SOL1 through contact a of relay 2CR.

A quarter of a second later, timer TR closes its contact b to energize solenoid SOL2 and relay 2TMR. Solenoid SOL2 raises the next pair of tapered rolls 34 and relay 2TMR closes its contact to complete a maintaining circuit for itself and for solenoid SOL2 through contact b of relay 2CR. It will be apparent that relay 2CR will be deenergized at this time. This is for the reason that the light beam of photo relay CPR is not interrupted whereby its contact is closed and relay TR1 is energized with its timed opening contact open in the circuit of relay 2CR.

A quarter of a second later, timer TR closes its contact c to energize solenoid SOL3 and relay 3TMR and a quarter of a second after that, the timer closes its contact d to energize solenoid SOL4 and relay 4TMR to cause the last two pairs of tapered rolls to be raised in sequence and to be maintained as hereinbefore described in connection with the first two pairs of rolls.

In the meantime, the trailing end of the stack has left limit switch LS2 to cause it to reclose and complete a maintaining circuit for relay TCMR through contact a of the latter. When the trailing end of the stack next leaves limit switch LS1 to allow it to reopen, nothing happens since relay TCMR is maintained.

The timer continues to run and time and next reopens its contact a about 1¼ seconds after it was closed. Contacts b, c and d of the timer then reopen at quarter second intervals in that order without effect since the transfer roll solenoids and maintaining relays are held energized.

Limit switch LS2 is provided to force resetting of the timer if the pacer releases another stack before the timer has reset itself. This second stack would open limit switch LS2 to deenergize relay TCMR whereby to reset the timer as hereinafter described.

In the normal sequence of events timer TR resets itself as follows. At the time its contact d reopens, the timer also opens resetting contact e to deenergize relay TCMR. This relay opens its contact a to interrupt its maintaining circuit and opens its contact b to deenergize clutch solenoid S. As a result, timer TR resets to normal position from which it can be reoperated as hereinbefore described.

Each stack arriving at the pacer is momentarily stopped by the pacer in a similar manner when it interrupts the light beam of photo relay PPR and is then released to enter the transfer unit. However, the tapered rolls will not be lowered and raised again for second and subsequent stacks coming in sequence. If more than one stack enters from the angular conveyor, the transfer rolls will be held in their raised positions since the four solenoids SOL1 to SOL4 are maintained.

However, if one stack comes along the in-line conveyor 2 and interrupts the light beam of photo relay CPR, the transfer rolls will be lowered and must be raised again when stacks are admitted from the angular conveyor. These rolls are lowered by photo relay CPR opening its contact to deenergize relay TR1 which energizes relay 2CR. Contacts a to d of relay 2CR interrupt the maintaining circuits of the four solenoids to lower the transfer rolls.

The manner in which the circuit in FIGS. 6a–c operates to control the transfer unit of FIG. 1 as a diverging unit will now be described. It will be apparent that motors 28 and 46 will be operated in the opposite direction to cause conveyance of newspaper stacks from input conveyor 8 to straight ahead conveyor 2 or to angular conveyor 4. For this purpose, a single transfer unit may be provided with both the converging control circuit of FIG. 5 and the diverging control circuit of FIGS. 6a–c with reversing connections to the two motors 28 and 46. This would allow the single transfer unit to be operated in either mode as desired. On the other hand, different transfer units may be equipped with the respective converging and diverging control circuits. In either case, the pushbutton switches shown in FIGS. 5 and 6a may be mounted on control panel 6d shown in FIG. 2 for access to manual operation by an operator.

Figure 6A:
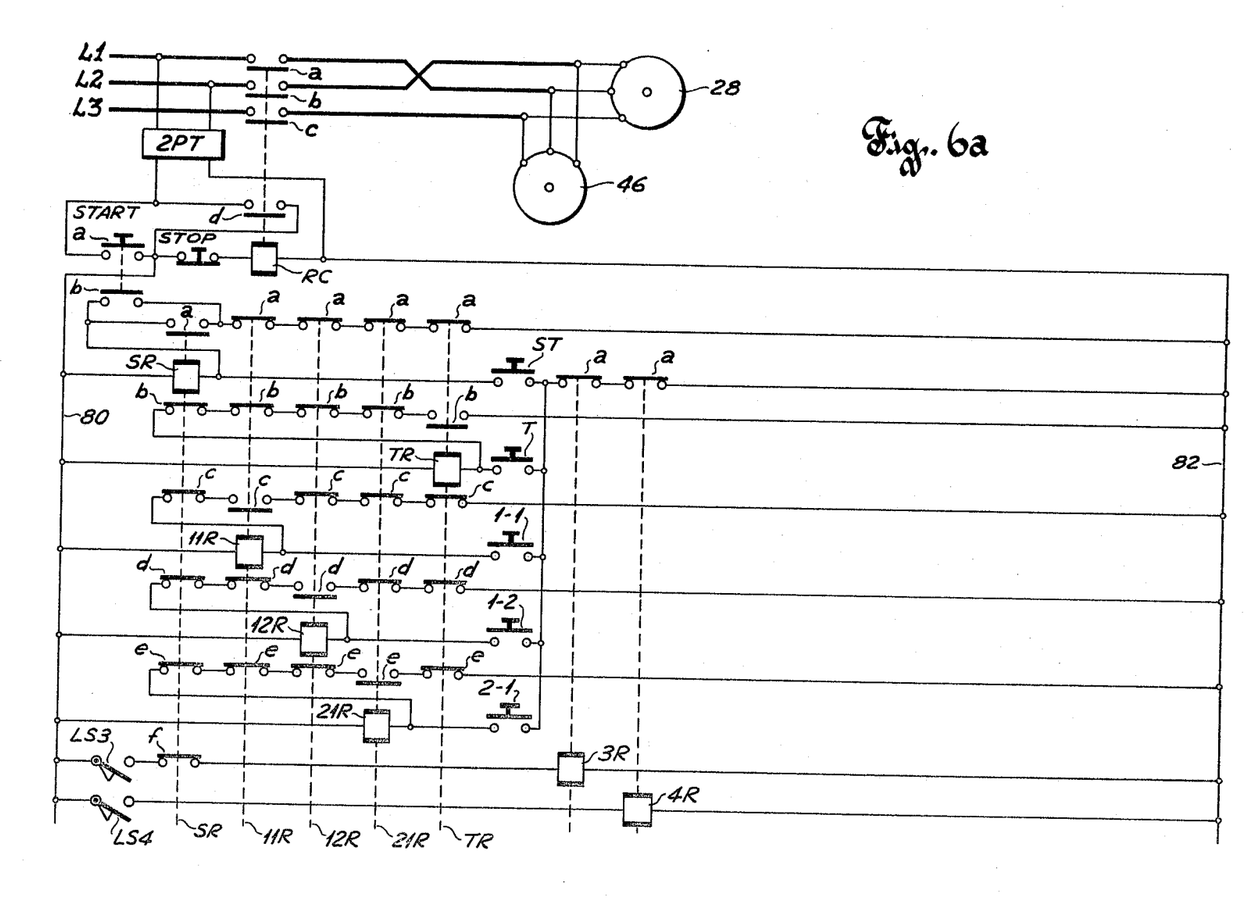
FIGS. 6a–c show a circuit diagram of a selective diverging control system for the stack transfer unit.

After electrical power has been connected to supply lines L1, L2 and L3 in FIG. 6a, the START switch may be pressed to close it contact a whereby power is applied through transformer 2PT across conductors 80 and 82 to energize main reversing contactor RC through the STOP switch which is normally closed. Pressing the START switch also closes its contact b to energize straight relay SR which sets the system for straight ahead conveyance of stacks from a conveyor 8 to conveyor 2. As will be apparent, the start switch is provided with the second contact b in parallel with contact a of straight relay SR so that when the system is started, it will always be initially set for straight ahead operation. The operation may then be changed to one of the other modes by pressing the appropriate button as hereinafter described.

Figure 6B:
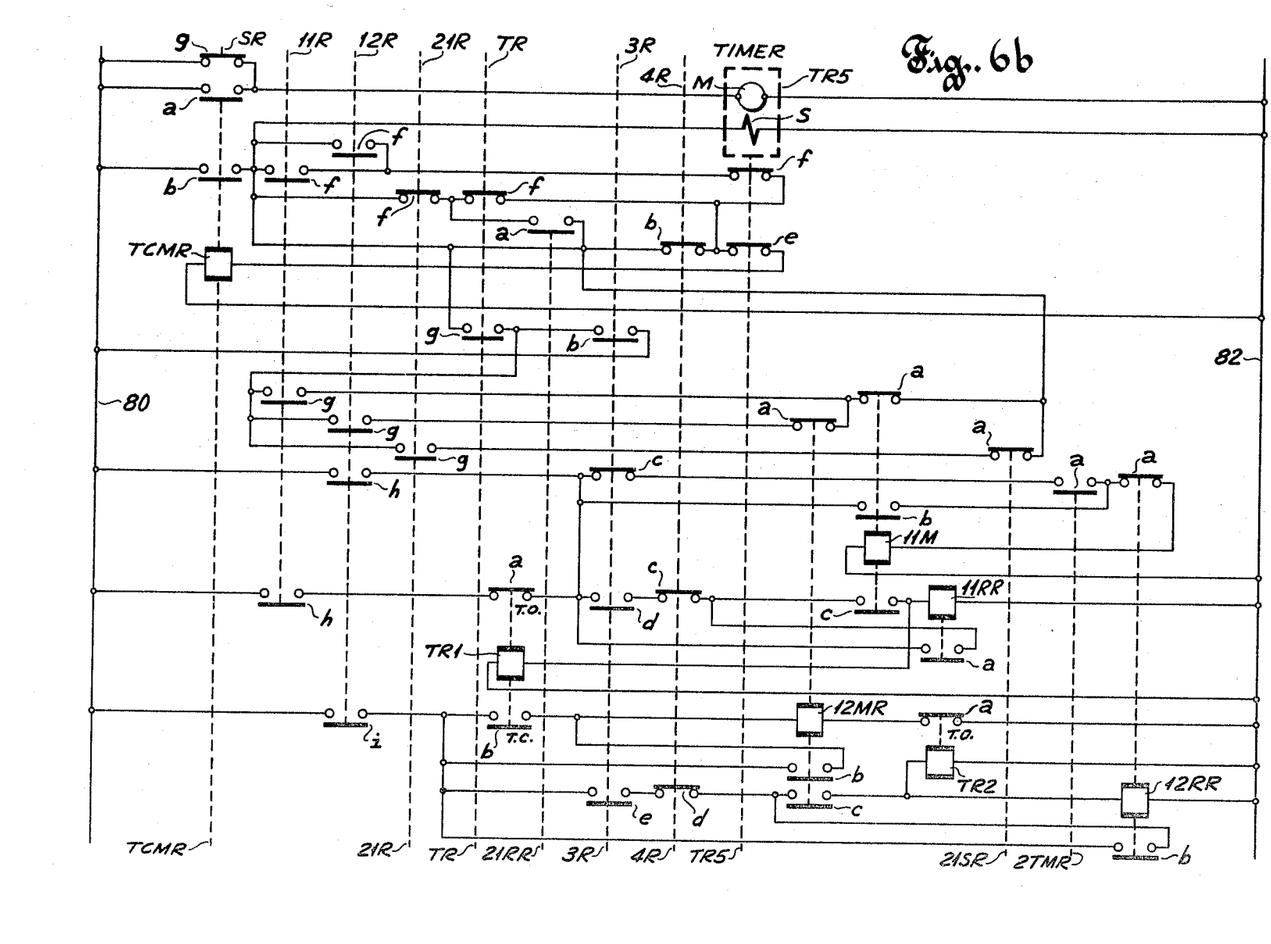
Figure 6C:
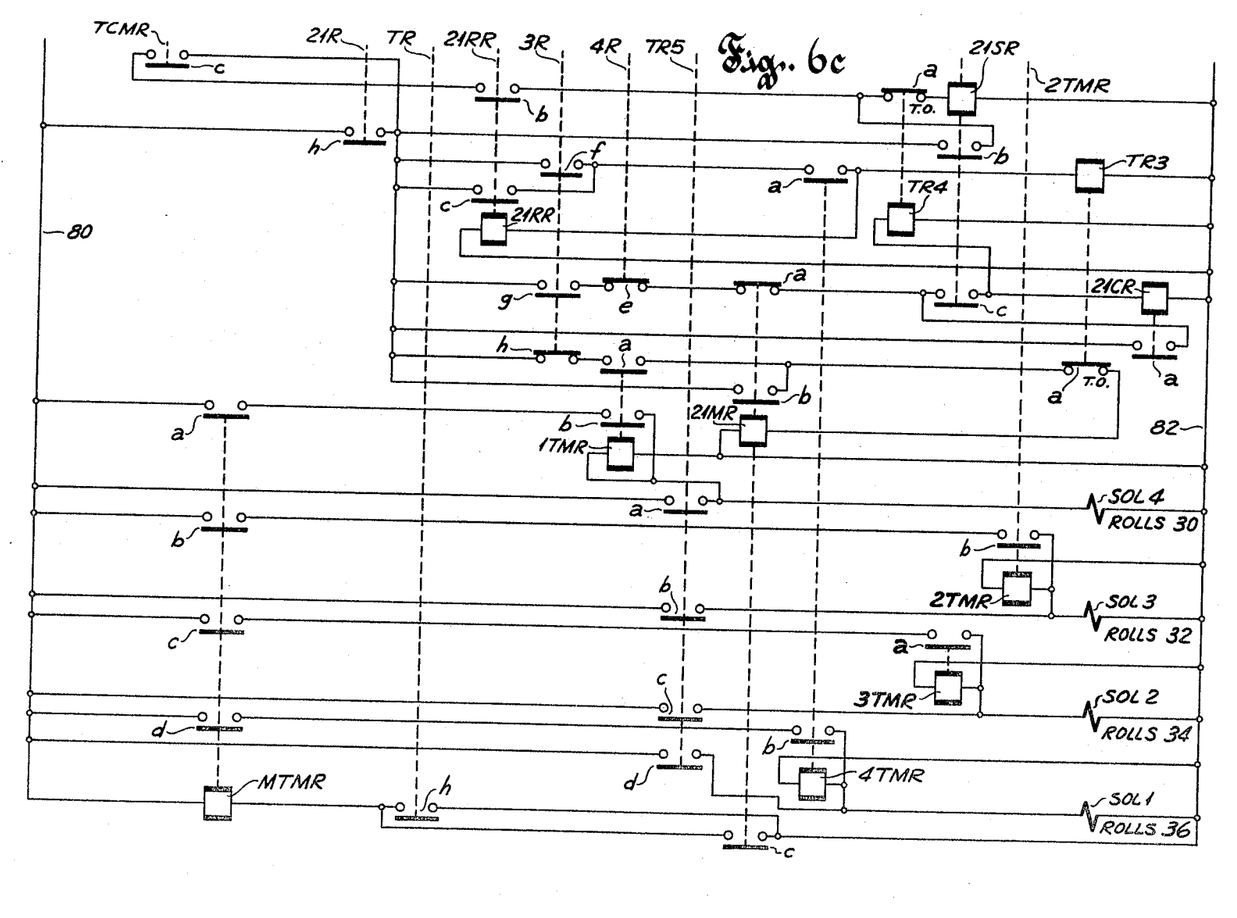

Five different modes of operation are provided for in the system of FIGS. 6a–c. As shown in the midportion of FIG. 6a, five pushbutton switches are provided for setting the system for any selected one of the five modes of operation including pushbutton ST for straight ahead operation from conveyor 8 to conveyor 2, pushbutton T for turn operation from conveyor 8 to angular conveyor 4, pushbutton 1—1 for alternate one turn and one straight operation, pushbutton 1-2 for alternate one turn and two straight operation and a pushbutton 2-1 for alternate two turn and one straight operation.

The aforementioned energization of contactor RC causes closure of its contacts a, b and c to connect three-phase power from supply lines L1, L2 and L3 to the motors to start motors 28 and 46 running in the proper direction whereby to convey newspaper stacks from conveyor 8 into the transfer unit. Power contactor RC also closes its contact d in shunt of contact a of the start switch.

The aforementioned energization of straight relay SR occurs through contact b of the start switch and contact a of each of relays TR, 11R, 12R, and 21R across power conductors 80 and 82. As a result, relay SR closes its self-maintaining contact a in shunt of the start switch contact b so that the start pushbutton switch may be released to allow it to reopen. Relay SR also opens its contacts b, c, d and e in the maintaining circuits of relays TR, 11R, 12R and 21R, respectively. Relay SR also opens its contact f to prevent energization of limit switch relay 3R thereby to prevent energization of timer clutch solenoid S or timer clutch maintaining relay TCMR. Relay SR further open its contact g to prevent operation of motor M of timer TR5. As will be apparent, this timer times the sequential raising of the diverting rolls and therefore is not needed in straight through mode of operation.

Now, if a stack of newspapers enters from conveyor 8 into the transfer unit, it will be conveyed straight ahead through to conveyor 2. The stack will first engage limit with is being held open. The trailing end of the stack opens its contact a to render all five mode selection pushbuttons ineffective so that the mode of operation cannot be changed after the stack has entered the transfer unit. Relay 4R also opens its contacts b–e without effect at this time.

The stack then engages and closes limit switch LS3 but without effect since straight relay contact f in series therewith is being held open. The trailing end of the stack then disengages limit switch LS4 to deenergize relay 4R and then disengages limit switch LS3 to allow it to reopen. The chain conveyor carries the stack straight to the endless belt conveyor from which it passes out to conveyor 2.

If an operating mode other than straight through is desired at start up, the operator presses the start pushbutton and then presses the desired operating mode pushbutton. In actual practice, an indicating light would be connected in parallel with each relay SR, TR, 11R, 12R, and 21R to indicate that the pushbutton may be released when the light comes on. If no stack is over limit switch LS4 or LS3, the control will immediately go into the operating mode selected. But it will be seen that if a stack is on one of these limit switches, the operating mode pushbutton must be held down until the stack allows limit switch LS3 to reclose so that relay 3R closes its contact a and thereby allows the operating mode relay SR, TR, 11R, 12R or 21R to energize. The stack that was on the limit switch when the pushbutton was pressed will complete its travel in accordance with the previous command and the new mode of operation will be applied first to a new stack entering the transfer unit.

The turn operating mode will now be described. Turn operation may be initiated at start up by pressing both the start button and turn button T. After another mode of operation has been used, turn operation may be obtained by pressing only the turn button. Since straight mode of operation has already been described, let it be assumed that the operation will now be changed to turn mode by pressing pushbutton switch T. Closure of switch T causes energiztion of turn relay TR through contacts a of relays 3R and 4R across conductors 80 and 82. Relay TR opens its contact a to deenergize straight relay SR whereby the latter restores its contacts to the positions shown in FIGS. 6a and 6b. Relay TR also closes its contact b to complete a maintaining circuit for itself through contacts b of the other four operating mode relays across conductors 80 and 82. Relay TR opens its contacts c, d and e to prevent energization of the remaining three operating mode relays. Relay TR opens its contact f in FIG. 6b to place timer clutch maintaining relay TCMR under the control of relay 4R having a contact b in parallel therewith. Relay TR closes its contact g to prepare a circuit for timer TR5 clutch solenoid S. And relay TR closes its contact h in FIG. 6c to energize main turn maintaining relay MTMR. As a result, relay MTMR closes its contacts a to d to prepare maintaining circuits for the four roll raising control solenoids and associated maintaining relays.

The aforementioned deenergization of relay SR in FIG. 6a causes reopening of its maintaining contact a and reclosing of its contacts b to g. Contact b closes a point in the maintaining circuit of turn relay TR and contacts c, d and e close in the maintaining circuits of the remaining three operating mode relays. Contact f prepares relay 3R for energization and contact g energizes motor M of timer TR5 to start the timer motor running. This timer times the raising of the tapered diverting rolls in paired sequence as hereinafter described.

As shown in FIG. 2, limit switch LS4 is ahead of limit switch LS3 so that the stack of newspapers engages limit switch LS4 first. This limit switch closes to energize relay 4R to open its contacts a to e. Contact a opens the operating mode relay circuit to prevent changing the operating mode after a stack has entered the transfer unit. Contact b opens to delay energization of relay TCMR until this contact recloses. Contacts c, d and e open without effect at this time since these contacts perform functions in other modes of operations.

The stack next engages limit switch LS3 to close it and energize relay 3R through contact f of relay SR across conductors 80 and 82. Relay 3R opens its contact a to maintain open the circuit of the other operating mode relays. Relay 3R closes its contact b to energize timer clutch solenoid S through contact g of relay TR across conductors 80 and 82. Relay 3R also opens its contacts c and h and closes its contacts d to g without effect at this time.

The aforementioned energization of the timer clutch solenoid starts the timer timing. This timer is provided with six contacts as shown in FIGS. 6b and 6c. Contacts a, b, c and d are set to close in sequence in that order about a fifth of a second apart and to reopen in like sequence about a half of a second after closure or after a time interval long enough to afford closure of the maintaining contacts. In this manner, timer contact a energizes solenoid SOL4 which operates a valve to admit compressed air into the cylinder to raise a pair of rolls 30 so that they turn and start diverting the stack toward the angular conveyor. The first turn maintaining relay 1TMR energizes in parallel with solenoid SOL4 and closes its contact *a* without effect at this time and closes its contact *b* to complete a maintaining circuit for itself and for solenoid SOL4 through contact *a* of relay MTMR across conductors 80 and 82.

In a similar manner, timer contacts *b*, *c* and *d* energize solenoids SOL3, SOL2 and SOL1 in sequence along with maintaining relays 2TMR, 3TMR and 4TMR, respectively, to raise the other three pairs of rolls to diverting position.

When the trailing end of the stack disengages limit switch LS4, the latter reopens to deenergize relay 4R. This relay recloses its contact *a* without effect since this circuit is still held open by contact *a* of relay 3R. Relay 4R recloses its contact *b* to energize timer clutch maintaining relay TCMR through contact *b* of relay 3R, contact *g* of relay TR and timer contact *e*. Relay TCMR closes its contact *a* to maintain the timer motor running, closes its contact *b* to maintain the timer clutch and itself energized independently of relays TR and 3R and closes its contact *c* without effect at this time.

When the trailing end of the stack leaves limit switch LS3, the latter reopens to deenergize relay 3R. This relay recloses its contact *a* to permit selection of another mode of operation and opens its contact *b* in the original energizing circuit of the timer clutch solenoid. Relay 3R also restores its contacts *c* to *h* to the positions shown in FIGS. 6*b* and 6*c*.

As hereinbefore mentioned, the timer contacts *a* to *d* will reopen in sequence. When the last timer contact reopens, timer resetting contacts *e* and *f* also open to reset the timer. Timer contact *e* deenergizes relay TCMR which reopens its contact *b* to deenergize timer clutch solenoid S which results in resetting of the timer.

The next and succeeding stacks will cause similar operation of the system except that solenoids SOL1, SOL2, SOL3 and SOL4 will remain energized and the tapered rolls will remain in raised position until another operating mode is selected.

The alternate one turn one straight mode of operation will now be described. To change to this mode of operation from the operation previously performed, pushbutton switch 1—1 is pressed to energize one turn one straight control relay 11R. This relay opens its contact *b* to deenergize relay TR, closes its contact *c* to maintain itself through contacts *c* of the other four operating mode relays across conductors 80 and 82 and opens its contacts *a*, *d* and *e* in the maintaining circuits of the other operating mode relays. Relay TR restores its contacts to the positions shown in the drawings, its contact *h* opening to deenergize relay MTMR. This relay deenergizes the four roll raising control solenoids to lower the diverting rolls and deenergizes their respectively associated maintaining relays 1TMR, 2TMR, 3TMR and 4TMR. Relay 11R also closes its contact *f* to prepare the maintaining circuit of relay TCMR, closes its contact *g* to prepare the energizing circuit of timer clutch solenoid S and closes its contact *h* to prepare the operating circuit of relays TR1, 11M and 11RR.

A stack now comes along and engages limit switch LS4 to energize relay 4R which opens its contacts *a* to *e*, contact *a* preventing selection of another mode of operation for the time being. The stack then engages and closes limit switch LS3 to energize relay 3R. This relay opens its contact *a* to keep the selection circuit open after the stack leaves limit switch LS4. Relay 3R also closes its contact *b* to energize timer clutch solenoid S through contact *g* of relay 11R and contact *a* of relay 11M across conductors 80 and 82. The same contact *b* of relay 3R also causes energization of relay TCMR through contact *g* of relay 11R, contact *a* of relay 11M, contact *f* of relay 11R and contacts *f* and *e* of timer TR5 across conductors 80 and 82. Relay TCMR closes its contact *a* to maintain the timer motor running, closes its contact *b* to maintain timer solenoid S and relay TCMR energized and closes its contact *c* without effect at this time.

The energization of the timer clutch solenoid starts the timing function whereby timer contacts *a*, *b*, *c*, and *d* are closed in timed sequence and thereafter reopened in timed sequence as hereinbefore described. These timer contacts cause the pairs of tapered rolls to be raised just ahead of the newspaper stack. First, timer contact *a* energizes solenoid SOL4 and relay 1TMR which are not maintained since relay MTMR has not been energized. This causes the first pair of rolls 30 to be raised. Next, timer contact *b* energizes solenoid SOL3 and relay 2TMR. This causes the second pair of rolls 32 to be raised just ahead of the stack. The stack leaves limit switch LS4 to deenergize relay 4R. This relay restores its contacts to the positions shown in the drawing.

The aforementioned energization of relay 2TMR in FIG 6*c* causes closure of its contact *a* in the circuit of relay 11M and causes closure of its contact *b* without effect. When the stack leaves limit switch LS3, relay 3R deenergizes and restores its contacts to the positions shown. Contact *c* of relay 3R energizes relay 11M through contact *h* of relay 11R, contact *a* of relay TR1, contact *a* of relay 2TMR and contact *a* of relay 12RR across conductors 80 and 82. Relay 11M which is the one turn one straight operating mode maintaining relay opens its contact *a* to prevent a second operation of timer TR5 when the second stack arrives, closes at its contact *b* a self-maintaining circuit in shunt of contact *c* of relay 3R and contact *a* of relay 2TMR, and closes its contact *c* to prepare relay 11RR for operation.

Timer TR5 continues to operate to raise the third and fourth pairs of rollers whereafter the four pairs of rollers are lowered in sequence when the stack has passed thereover to the angular conveyor. At the same time as timer contact *d* reopens, timer reset contacts *e* and *f* open to deenergize relay TCMR which deenergizes the timer clutch solenoid S to reset the timer.

The second stack now comes along and engages limit switch LS4 to energize relay 4R and then engages limit switch LS3 to energize relay 3R. However, contact *b* of relay 3R cannot now energize clutch solenoid S of timer TR5 and relay TCMR because contact *a* of relay 11M is open so that this second stack will be conveyed straight through the transfer unit.

When the stack leaves limit switch LS4, relay 4R deenergizes and restores its contacts to the positions shown. Contact *c* of relay 4R closes to energize relays 11RR and TR1 in parallel with one another through contact *h* of relay 11R, timed opening contact *a* of relay TR1, contact *d* of relay 3R and contact *c* of relay 11M. Relay 11RR closes its contact *a* to close a maintaining circuit for itself and relay TR1 in shunt of contact *d* of relay 3R and contact *c* of relay 4R. Relay TR1 starts timing but its timed opening contact *a* remains closed and its timed closing contact *b* remains open until it times out. The time interval of relay TR1 is set to allow enough time for the stack to pass the transfer area.

When the stack leaves limit switch LS3, it reopens to deenergize relay 3R which restores its contacts to the positions shown. Although contact *d* of relay 3R opens, relays 11RR and TR1 are maintained in shunt thereof.

When the stack has passed the transfer area, relay TR1 times out and opens its contact *a* and closes its contact *b*. Contact *a* deenergizes relays 11M, 11RR, and TR1. The contacts of these relays restore to the positions shown. Closure of contact *a* of relay 11M allows operation of timer TR5 when the third stack enters the transfer unit so that it will be diverted. Thus, alternate stacks are turned and conveyed straight.

The alternate one turn two straight mode of operation will now be described. This mode of operation requires depressing of pushbutton switch 1–2 in FIG. 6a. This causes energization of relay 12R to open its contacts a, b, c and e and to close its contacts d and f to i. Contacts a, b, c and e open the circuits of the other operating mode relays, contact c deenergizing relay 11R, and contact d completes a self-maintaining circuit through contacts of the other operating mode relays. Contact f prepares the maintaining circuit of relay TCMR and contact g prepares the operating circuit of timer clutch solenoid S and relay TCMR for operation. Contacts h and i prepare further control circuits hereinafter described.

When the first stack enters the transfer unit and engages limit switch LS4, relay 4R energizes as hereinbefore described. The stack then closes limit switch LS3 to energize relay 3R. The stack then disengages limit switch LS4 to deenergize relay 4R and to restore its contacts. This causes energization of the timer clutch solenoid S through contact b of relay 3R, contact g of relay 12R, contact a of relay 12MR and contact a of relay 11M across conductors 80 and 82. Relay TCMR energizes through these same contacts plus contact f of relay 12R and contacts f and e of timer TR5. Relay TCMR at its contact b closes a maintaining circuit for itself and the timer clutch solenoid to maintain them when the stack disengages limit switch LS3.

The timing cycle now begins and the pairs of tapered rolls are raised in sequence to turn the first stack to the angular conveyor. Contact a of timer TR5 first closes to raise the first pair of rolls 30. Then timer contact b closes to raise the second pair of rolls as hereinbefore described. For this purpose, solenoids SOL4 and SOL3 and relays 1TMR and 2TMR energize. Since relay MTMR is not energized, the rolls are not maintained up but are lowered after the stack passes thereover. Relay 2TMR closes its contact a in the circuit of relay 11M.

When the stack leaves limit switch LS3, relay 3R restores and at its contact c energizes relay 11M through contact h of relay 12R and contacts a of relays 12RR and 2TMR. Relay 11M opens its contact a to prevent reoperation of timer TR5 when the second stack arrives, closes its contact b for self-maintaining purposes and closes its contact c in the circuit of relay 11RR.

The timer TR5 then continues operating and at its contacts c and d causes the third and fourth pairs of rollers to be raised so that the first stack is diverted to the angular conveyor. The timer contacts a–d then reopen in sequence and the four solenoids and respective maintaining relays restore. Relay 2TMR reopens its contact a but relay 11M is maintained. The timer then opens its contacts e and f for a time interval to reset itself by deenergizing its clutch solenoid and relay TCMR.

When the second stack now arrives and engages limit switch LS4 and then limit switch LS3, the timer TR5 clutch solenoid S and relay TCMR cannot energize because contact a of relay 11M is open. When the stack releases limit switch LS4 to restore relay 4R, relay 3R still being energized, contact c of relay 4R energizes relay 11RR and timing relay TR1 as hereinbefore described. Relay 11RR closes its contact a to maintain itself and relay TR1 in shunt of contacts c and d of relays 4R and 3R, respectively. Relay TR1 starts timing.

Since the timer TR5 has not been energized, the rollers remain down and the second stack is conveyed by the chain conveyor straight through. At about the time that the second stack leaves limit switch LS3, relay TR1 times out and opens its contact a and closes its contact b. Contact b energizes relay 12MR through contact i of relay 12R and contact a of relay TR2. Contact a of relay TR1 opens to deenergize relays 11M, 11RR and TR1.

Relay 12MR opens its contact a to prevent energization of the timer clutch solenoid when the third stack arrives, closes its contact b to self-maintain in shunt of contact b of timer relay TR1, and closes its contact c to prepare relay 12RR for energization.

When the third stack engages limit switch LS4 and then limit switch LS3, relay 3R energizes but the timer TR5 clutch solenoid cannot energize because contact a of relay 12MR is held open. When the stack leaves limit switch LS4 and deenergizes relay 4R, contact d of the latter energizes relay 12RR and timing relay TR2 through contact i of relay 12R, contact e of relay 3R and contact c of relay 12MR. Relay 12RR which is the one turn two straight reset relay opens its contact a in the circuit of relay 11M and closes its contact b for self-maintaining purposes. Relay TR2 begins its timing cycle.

Since timer TR5 has not been operated the third stack is conveyed by the endless chains straight through the transfer unit. When the third stack leaves limit switch LS3, timing relay TR2 times about the same time. Relay 3R restores to the position shown and relay TR2 opens its contact to deenergize relay 12MR. This relay in turn at its contact c deenergizes relays TR2 and 12RR. Relay 12MR recloses its contact a so that the timer clutch solenoid can again be operated.

The one turn two straight cycle is now complete and will be repeated upon the arrival of the next three stacks in the same manner.

The two turn one straight mode of operation will now be described. This mode of operation is initiated by depressing pushbutton switch 2–1. This causes energization of relay 21R and opening of its contacts a to d and f and closing of its contacts e, g and h. Contacts a to d open the maintaining circuits of the other operating mode relays, contact d deenergizing relay 12R. Contact e closes a self-maintaining circuit. Contact f opens a point in the circuit of relay TCMR. Contact g closes a point in the circuit of the timer clutch solenoid. And contact h closes a point in the circuit of control relays hereinafter described.

The first stack now arrives at the transfer unit and engages limit switch LS4 first and then limit switch LS3. Relay 4R energizes and operates its contacts and then relay 3R energizes and operates its contacts. Contact b of relay 3R energizes the timer clutch solenoid S through contact g of relay 21R, and contact a of relay 21SR. When the first stack leaves limit switch LS4, relay 4R deenergizes and closes its contact b to energize relay TCMR through contact b of relay 3R, contact g of relay 21R, contact a of relay 21SR and contact e of timer TR5. Relay TCMR closes its contact a to maintain the timer motor running, closes a self-maintaining circuit at its contact b and closes its contact c in the circuit of relay 21SR.

When the first stack now leaves limit switch LS3 and deenergizes relay 3R and the timer runs to close contacts a to d in sequence energizing the roll solenoids SOL4, SOL3, SOL2 and SOL1 in sequence and energizing relays 1TMR, 2TMR, 3TMR and 4TMR along with the solenoids, relay 21MR in FIG. 6c energizes through contact h of relay 21R, contact h of relay 3R, contact a of relay 1TMR and contact a of relay TR3 across conductors 80 and 82. Relay 21MR opens its contact a to prevent energization of relay 21CR, closes its contact b in shunt of contact h of relay 3R and contact a of relay 1TMR for self-maintaining purposes, and closes its contact c to energize relay MTMR. This relay closes its contacts a–d to prepare the maintaining circuits for the roll solenoids.

As the roll solenoids are energized to raise the rolls in sequence to divert the first stack to the angular conveyor, the roll solenoids are maintained energized by associated relays 1TMR, 2TMR, 3TMR and 4TMR. Relay 3TMR maintains at its contact a and relay 4TMR maintains at its contact b. Relay 4TMR also closes its contact a to prepare a circuit for relay 21RR and timing relay TR3. When timer TR5 opens its contacts e and f, the timer clutch solenoid and relay TCMR are deenergized to reset the timer.

When the second stack arrives, it closes limit switch LS4 and then closes limit LS3 and then disengages and reopens limit switch LS4. Relay 4R energizes, then relay 3R energizes and relay 4R restores. Contact *f* of relay 3R energizes relay 21RR and timing relay TR3 through contact *h* of relay 21R and contact *a* of relay 4TMR. Timing relay TR3 starts timing but its timed opening contact *a* in the meantime remains closed. Relay 3R closes its contact *b* to energize timer clutch solenoid S to run the timer but this will have no effect since the rolls are maintained raised except to keep the timer in step with the operation. Relay 21RR closes its contact *a* to energize relay TCMR through contact *b* of relay 3R, contact *g* of relay 21R, contact *a* of relay 21SR, contact *f* of relay TR and contact *e* of timer TR5 across conductors 80 and 82. Relay TCMR closes its contacts *a*, *b* and *c*. Relay 21RR closes its contact *b* to energize relay 21SR through contact *h* of relay 21R, contact *c* of relay TCMR and contact *a* of relay TR4. Relay 21RR also closes its contact *c* for self-maintaining in shunt of contact *f* of relay 3R.

The aforementioned energization of relay 21SR opens its contact *a* in the timer clutch solenoid energizing circuit, the timer clutch solenoid being maintained by relay TCMR. Relay 21SR closes its maintaining contact *b* in shunt of contacts *b* and *c* of relays 21RR and TCMR, respectively. Relay 21SR also closes its contact *c* to prepare relay 21CR for operation.

In the meantime, the second stack leaves limit switch LS3 to deenergize relay 3R and is diverted to the angular conveyor. When the second stack passes the last pair of rolls, relay TR3 times out and opens its timed opening contact *a* to deenergize relay 21MR. This relay closes its contact *a* to prepare relay 21CR and timing relay TR4 for operation, opens its self-maintaining contact *b* and opens its contact *c* to deenergize relay MTMR. As a result, all four roll solenoids and associated maintaining relays are deenergized and the tapered rolls are lowered so that the third stack will go straight through the transfer unit.

When the third stack arrives and closes limit switches LS4 and LS3 in sequence, contact *b* of relay 3R closes but the timer clutch solenoid C does not energize because contact *a* of relay 21SR is being held open. Relay 3R closes its contact *g* and when the third stack leaves limit switch LS4 to deenergize relay 4R, contact *e* of the latter closes to energize relay 21CR and timing relay TR4 through contact *h* of relay 21R, contact *g* of relay 3R, contact *a* of relay 21MR and contact *c* of relay 21SR across conductors 80 and 82. Relay 21CR closes its contact *a* in shunt of the contacts of relays 3R, 4R and 21MR for maintaining purposes and relay TR4 starts timing.

The third stack now is conveyed by the endless chains straight ahead thereby to complete the operating mode that was selected, namely, two turn one straight ahead. When the third stack leaves limit switch LS3, relay 3R restores. Also, when this stack has passed the transfer area, timer TR4 times out causing opening of its timed opening contact *a* to deenergize relay 21SR. This relay opens its contact *c* to deenergize relay 21CR, opens its contact *b* to open its maintaining circuit, and closes its contact *a* to again permit energization of the timer TR5 clutch solenoid S on the next cycle of the same operating mode of two turn and one straight. This same operating mode will be repeated until another one is selected.

As will be apparent any other mode of operation may be selected by merely pressing the appropriate selector pushbutton switch. And the system may be stopped by pressing the STOP button in FIG. 6a whereby contactor RC is deenergized to disconnect power from the control system and to stop the two drive motors.

While the apparatus hereinafter described is effectively adapted to fulfill the objects stated, it is to be understood that we do not intend to confine our invention to the particular preferred embodiments of transfer conveyor units and control systems therefor disclosed, inasmuch as they are susceptible of various modifications without departing from the scope of the appended claims.

We claim:
1. In a transfer conveyor system having a transfer unit including infeed and outfeed conveyor sections, two of said conveyor sections being in a straight line and the third conveyor section being at an angle thereto, a transfer device between said conveyor sections for transferring articles therebetween comprising:
   a straight through conveyor extending between said straight line conveyor sections for conveying articles therebetween and comprising a plurality of relatively narrow endless elements in laterally spaced apart relation and means guiding and supporting the upper runs of said endless elements to afford engagement with articles being conveyed thereby;
   a plurality of turning rollers arranged in an arc between one of said straight line conveyor sections and the angular conveyor section and comprising peripheral grooves in at least some of said rollers through which said guiding and supporting means extend;
   and electrical control means comprising:
   means for driving said endless elements in a predetermined direction to convey articles from one of said straight line conveyor sections to the other one;
   means for driving said turning rollers for conveyance of articles in the same direction immediately adjacent said one straight line conveyor section as said straight through conveyor conveys them;
   said turning rollers having a normal position wherein the upper peripheral portions thereof are below the upper runs of said endless elements;
   and means for raising said turning rollers in a plurality of sequential steps so that an article which has started in a straight line direction will not be interfered with by said turning rollers and said turning rollers will convey and turn the next article.
2. The invention defined in claim 1, wherein said plurality of relatively narrow endless elements comprise:
   a plurality of endless chains spaced apart sufficiently to be adapted to convey articles such as free standing stacks of untied newspapers.
3. The invention defined in claim 2, wherein said means guiding and supporting the upper runs of said endless chains comprise:
   narrow metal channels rigidly supported beneath the upper runs of the respective chains and extending through the peripheral grooves in said turning rollers.
4. The invention defined in claim 1, wherein:
   said turning rollers are tapered and have their larger diameter ends directed to the outside of said arc and their smaller diameter ends directed to the inside of said arc.
5. The invention defined in claim 1, wherein said means for raising said turning rollers in a plurality of sequential steps comprises:
   a unitary supporting bracket for each adjacent pair of turning rollers;
   a solenoid operated valve and compressed air cylinder for raising and lowering said supporting bracket;
   means spaced from said cylinder along said bracket for guiding said bracket and the turning rolls mounted thereon for vertical movement;
   and sprockets and chains coupling rolls of each pair and adjacent rolls of adjacent pairs for driving the same.
6. The invention defined in claim 1, wherein said electrical control means also comprises:
   means for operating said transfer unit as a diverging device including means for operating said driving means of the straight through conveyor and said driving means of said turning rollers in a direction to convey articles from said one straight line conveyor section to either the other straight line conveyor section or to said angular conveyor section;
   means for selecting a straight through mode of operation;

and means responsive to operation of said selecting means for preventing the raising of said turning rollers.

7. The invention defined in claim 1, wherein said electrical control means also comprises:
means for operating said transfer unit as a diverging device including means for operating said driving means of the straight through conveyor and said driving means of said turning rollers in a direction to convey articles from said one straight line conveyor section to either the other straight line conveyor section or to said angular conveyor section;
means for selecting a turning mode of operation;
means for detecting the arrival of an article at said transfer unit;
and means responsive to said detecting means following operation of said selecting means for operating said turning rollers raising means and for maintaining said rollers in raised position.

8. The invention defined in claim 1, wherein said electrical control means also comprises:
means for operating said transfer unit as a diverging device including means for operating said driving means of the straight through conveyor and said driving means of said turning rollers in a direction to convey articles from said one straight line conveyor section to either the other straight line conveyor section or to said angular conveyor section;
means for selecting an alternate one turn one straight mode of operation;
means for detecting the arrival of successive articles at said transfer unit;
and means responsive to said detecting means following operation of said selecting means for operating said turning rollers raising means to raise and lower said rollers to cause alternate turning and straight through conveyance of successive articles.

9. The invention defined in claim 1, wherein said electrical control means also comprises:
means for operating said transfer unit as a diverging device including means for operating said driving means of the straight through conveyor and said driving means of said turning rollers in a direction to convey articles from said one straight line conveyor section to either the other straight line conveyor section as one branch or to said angular conveyor section as another branch;
means for selecting an alternate one to one of said branches and a plurality to the other of said branches mode of operation;
means for detecting the arrival of successive articles at said transfer unit;
and means responsive to said detecting means following operation of said selecting means for operating said turning rollers raising means to raise and lower said rollers so as to cause alternate conveyance of one article to one of said branches and a plurality of articles to the other of said branches.

10. The invention defined in claim 1, wherein said electrical control means also comprises:
means for operating said transfer unit as a converging device including means for operating said driving means of the straight through conveyor and said driving means of said turning rollers in a direction to convey articles from said other straight line conveyor section as one branch or from said angular conveyor section as another branch to said one straight line conveyor section;
means on each of said branches for detecting the arrival of articles;
means on one of said branches for stopping articles so that articles arriving on the other branch have preference for entering said transfer unit;
means responsive to detection of the arrival of articles on said other branch for operating and maintaining said stopping means on said one branch;
and means responsive to a predetermined time interval after the detection of the last article on said other branch for operating said stopping means to release an article from said one branch.

References Cited

UNITED STATES PATENTS

| | | | |
|---|---|---|---|
| 1,737,762 | 12/1929 | Howe | 198—38 X |
| 1,934,377 | 11/1933 | Robbins | 198—38 |
| 3,138,238 | 6/1964 | De Good et al. | 198—127 |
| 3,279,583 | 10/1966 | Abegglen | 198—38 |

EVON C. BLUNK, *Primary Examiner.*

M. L. AJEMAN, *Assistant Examiner.*

UNITED STATES PATENT OFFICE
CERTIFICATE OF CORRECTION

Patent No. 3,334,723                                        August 8, 1967

Reginald A. Reed et al.

It is hereby certified that error appears in the above numbered patent requiring correction and that the said Letters Patent should read as corrected below.

Column 2, line 58, for "frictionaly" read -- frictionally --; column 3, line 20, for "hereinabove" read -- hereinbefore --; column 4, line 2, for "thef rame" read -- the frame --; column 6, line 53, for "closed timing" read -- closed timed --; column 6, line 67, for "this really" read -- this relay --; column 7, line 30, for "not" read -- now --; column 9, line 3, for "it" read -- its --; line 54, strike out "with is being held open. The trailing end of the stack" and insert instead -- switch LS4 and close it to energize relay 4R. This relay --; column 15, line 39, for "C" read -- S --.

(SEAL)          Signed and sealed this 18th day of June 1968.

Attest:

Edward M. Fletcher, Jr.                                    EDWARD J. BRENNER

Attesting Officer                                              Commissioner of Patents